(12) United States Patent
Taylor

(10) Patent No.: US 11,118,725 B2
(45) Date of Patent: Sep. 14, 2021

(54) EXTENDABLE UNIVERSAL SUPPORT ASSEMBLY

(71) Applicant: Wayne A. Taylor, Quaker Hill, CT (US)

(72) Inventor: Wayne A. Taylor, Quaker Hill, CT (US)

(*) Notice: Subject to any disclaimer, the term of this patent is extended or adjusted under 35 U.S.C. 154(b) by 0 days.

(21) Appl. No.: 16/774,551

(22) Filed: Jan. 28, 2020

(65) Prior Publication Data
US 2020/0400271 A1 Dec. 24, 2020

Related U.S. Application Data

(60) Provisional application No. 62/865,487, filed on Jun. 24, 2019.

(51) Int. Cl.
| | | |
|---|---|---|
| *F16M 11/20* | (2006.01) | |
| *F16M 11/04* | (2006.01) | |
| *F16M 13/02* | (2006.01) | |

(52) U.S. Cl.
CPC ....... *F16M 11/2092* (2013.01); *F16M 11/045* (2013.01); *F16M 11/2014* (2013.01); *F16M 13/02* (2013.01)

(58) Field of Classification Search
CPC .............. F16M 11/2014; F16M 11/08; F16M 11/2085; F16M 11/2092; F16M 2200/061
USPC ........................................................ 248/921
See application file for complete search history.

(56) References Cited

U.S. PATENT DOCUMENTS

| | | | | |
|---|---|---|---|---|
| 5,400,993 | A * | 3/1995 | Hamilton ............... | F16M 11/10 248/279.1 |
| 6,491,268 | B1 * | 12/2002 | Channer ............ | A47B 21/0314 108/55.5 |
| 6,648,289 | B2 * | 11/2003 | Toennesland ............ | A61B 8/00 248/131 |
| 8,359,982 | B2 * | 1/2013 | Lebel .................... | A47B 23/043 108/44 |
| 8,693,172 | B2 * | 4/2014 | Russell .............. | F16M 11/2014 361/679.01 |
| 9,383,060 | B2 * | 7/2016 | Geier ...................... | F16M 11/38 |
| 9,993,071 | B2 * | 6/2018 | Hung ................. | F16M 11/2021 |
| 10,010,177 | B1 * | 7/2018 | Pei ..................... | F16M 11/2014 |
| 10,563,811 | B2 * | 2/2020 | Pei ..................... | F16M 11/2092 |
| 10,595,634 | B2 * | 3/2020 | Pei ..................... | F16M 11/2092 |

(Continued)

*Primary Examiner* — Bradley Duckworth
(74) *Attorney, Agent, or Firm* — Alix, Yale & Ristas, LLP

(57) ABSTRACT

An extendable universal support assembly is especially adapted for use in maintaining computers and other electronic devices. A mounting bracket pivotally mounts two laterally spaced sets of pairs of vertically aligned anchors. A first set of pairs of arms of substantially equal length are pivotally mounted to the bracket anchors. A second set of arms of uniform length are mounted between the arms of the first set of arms by a pin to define a second pair of parallel pivot axes which are parallel to the first pair of parallel pivot axes. A frame is pivotally mounted to the second set of arms. A table is rotatably mounted to a platform supported on the frame and is positionable about a rotation axis parallel to the first and second pivot axes. The table is variably positionable relative to the mounting bracket and is rotatable about the axis of rotation. A pair of retainers is preferably mounted to the table and adjustably positionable relative to the table for retaining the computer or device on the table.

12 Claims, 17 Drawing Sheets

(56) References Cited

U.S. PATENT DOCUMENTS

| | | | |
|---|---|---|---|
| 10,844,999 B2 * | 11/2020 | Pei | F16M 13/02 |
| 10,935,179 B2 * | 3/2021 | Hung | H02G 3/04 |
| 10,944,937 B2 * | 3/2021 | Pei | F16M 11/2092 |
| 10,957,966 B2 * | 3/2021 | Barkan | H01Q 1/44 |
| 10,969,056 B2 * | 4/2021 | Pei | F16M 11/2092 |
| 2004/0164208 A1 * | 8/2004 | Nielson | H02G 11/00 |
| | | | 248/49 |
| 2011/0031785 A1 * | 2/2011 | Steenson | A47C 7/543 |
| | | | 297/161 |
| 2017/0085828 A1 * | 3/2017 | Shen | H04N 5/64 |
| 2021/0010632 A1 * | 1/2021 | Pei | F16M 13/02 |

* cited by examiner

EXTENDABLE UNIVERSAL SUPPORT ASSEMBLY

CROSS-REFERENCE TO RELATED APPLICATION

This application claims the priority of U.S. Provisional Patent Application No. 62/865,487 filed on Jun. 24, 2019, the disclosure of which is incorporated in its entirety by reference.

BACKGROUND

This disclosure relates generally to wall mounted support assemblies. More particularly, this disclosure relates to a multi-positional support for a computer and similar electronic devices.

For applications which are addressed by the present disclosure, computers and other equipment are desirably accessible at intermittent times; at other times, it is desired that they be moved to more inaccessible storage positions. For additional applications addressed by the present disclosure, it is desirable to have a computer or electronic item at an elevated position wherein the computer or item can be easily accessible at all sides.

The present disclosure provides a wall mounted support of rugged and compact construction which is efficiently transformable from a retracted to an extended position and also allows for essentially universal positioning of a support platform. The support platform is also flexibly adjustable to accommodate objects having a wide range of dimensions and configurations. In addition, the support platform in an extended position is capable of supporting an object having a significant weight.

SUMMARY

Briefly stated, a support assembly for a computer or electronic device comprises a mounting bracket. The mounting bracket has a base laterally extending between first and second ends. A first set of arms is pivotally mounted to the bracket at laterally spaced positions and defines a first pair of parallel pivot axes. A second set of arms is pivotally mounted to an arm of the first set of arms and defines a second pair of parallel pivot axes. A frame is pivotally mounted to the second pair of arms. A table is rotatably mounted to the frame and positionable about a rotation axis parallel to the first and second pivot axes. The table is variably transversely positionable relative to the mounting bracket and rotatable about the rotation axis.

A pair of opposed retainers is mounted to the table. The positions of the retainers are adjustable. At least one wire retaining strap is preferably mounted to an arm or to the frame. The pair of opposed parallel retainers is mounted to the table via L-shaped supports and adjustably positionable relative to the table. The mounting bracket further comprises two pairs of aligned integral anchors projecting substantially perpendicular from a planar panel of the base. Each of the anchors defines an opening for receiving a pivot pin. The first set of arms is substantially identical, and the second set of arms is substantially identical. Each arm of the first and second set of arms preferably has a substantially rectangular tubular form.

A support assembly for a computer comprises a mounting bracket having a planar first side with a plurality of openings and two laterally spaced sets of two pairs of vertically aligned anchors integrally projecting at an opposite second side. A first set of two pairs of arms is pivotally mounted to the bracket anchors and defines a first pair of parallel pivot axes. A second set of arms wherein each arm is pivotally mounted to and between two arms of the first set of arms by a pin defines a second pair of parallel pivot axes. A frame is pivotally mounted to the second set of arms and comprises four posts parallel to the first and second pairs of pivot axes wherein two pairs of posts are each connected by a pair of parallel cross supports. A table is rotatably mounted to the frame and positionable about a rotation axis parallel to the first and second pivot axes. The table is variably positionable relative to the mounting bracket and rotatable about the rotation axis.

At least one wire retaining strap is mounted to an arm or to the frame. A pair of opposed parallel retainers is mounted to the table and adjustably axially positionable relative to the table. Each of the anchors defines an opening for receiving a pivot pin. The arms of the first set of arms are substantially identical, and the arms of the second set of arms are substantially identical. Each arm of the first set of arms and the second set of arms preferably has a substantially rectangular tubular form. The anchors are perpendicular to the first side and the two pairs of four aligned anchors each have openings for receiving a pivot pin.

An extendable support assembly for a computer or electronic device comprises a mounting bracket having a planar first side with a plurality of openings and two laterally spaced sets of two pairs of vertically aligned anchors integrally projecting at an opposite second side. A first set of two pairs of arms of length L are pivotally mounted to the bracket anchors and define a first pair of parallel pivot axes. A second set of arms of length t, wherein each arm is pivotally mounted between two arms of the first set of arms, defines a second pair of parallel pivot axes. The frame is pivotally mounted to the second set of arms and comprises four posts parallel to the first and second pair of pivot axes. Two posts receive a pivot member for pivotally mounting the frame to a second set of arms and two pairs of posts are each connected by a pair of cross supports. The frame mounts a platform. A table is rotatably mounted to the platform and positionable about a rotational axis parallel to the first and second pivot axes. The table is variably positionable relative to the mounting bracket and rotatable about the rotation axis.

The arms of the first set of arms are substantially identical. The arms of the second set of arms are substantially identical. Each arm of the first and second set of arms preferably has a substantially rectangular elongated tubular form. A plurality of wire retaining straps is preferably mounted to an arm and to the frame. A pair of opposed parallel retainers is mounted to the table and adjustably axially positionable relative to the table. Each of the anchors defines an opening for receiving a pivot pin. The anchors are perpendicular to the first side. The two pairs of four aligned anchors each have openings for receiving a pivot pin.

DETAILED DESCRIPTION

With reference to the drawings wherein like numerals represent like parts throughout the several figures, a support assembly which provides a variably positionable support for a computer C, an electronic device or other object is generally designated by the numeral 10. Support assembly 10 is adapted to mount to a wall or other vertical structure and to extend and/or retract relative to the wall to provide a variably positionable support platform that is universally positionable about a central vertical axis of the platform.

Figure 4:
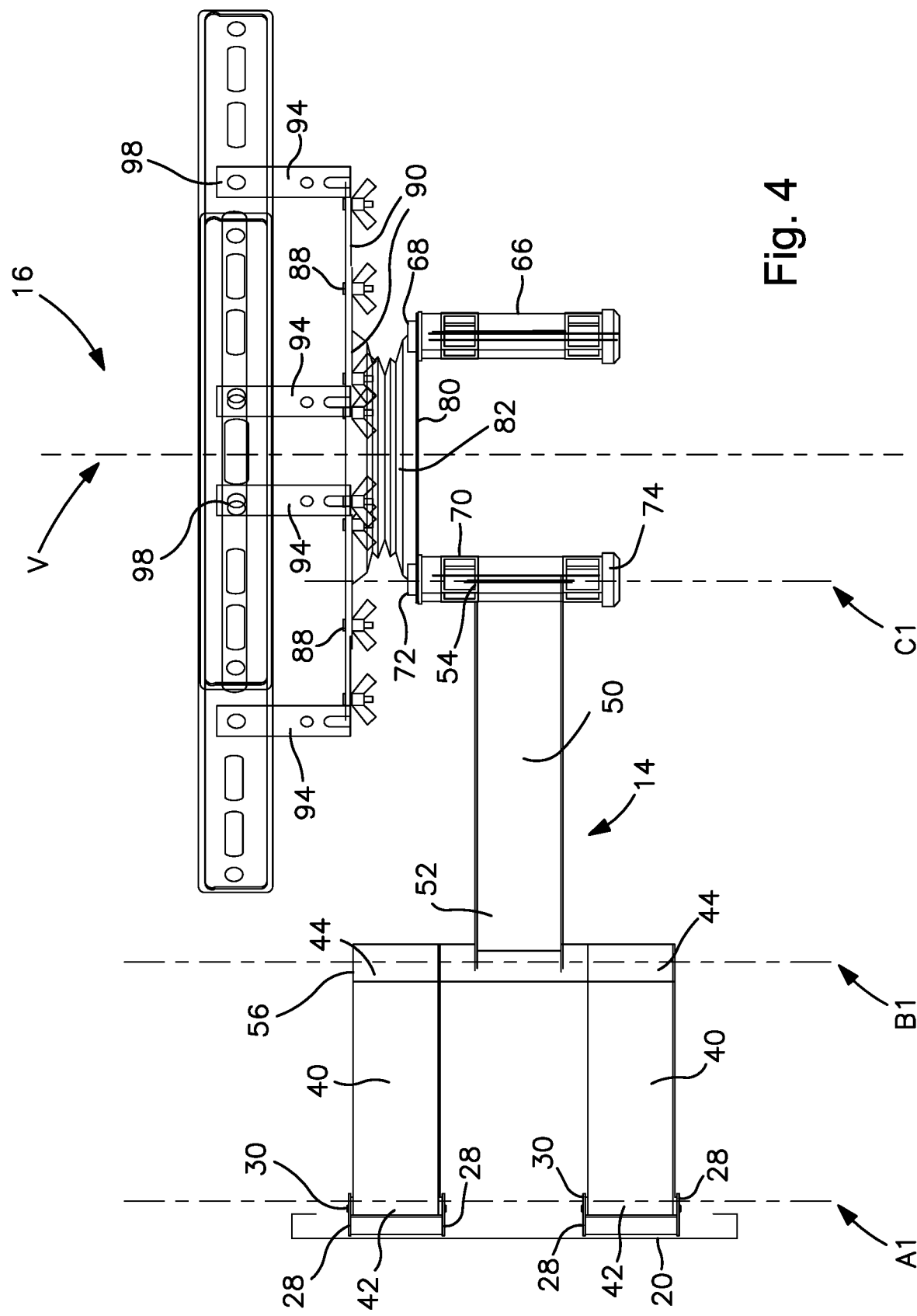
FIG. 4 is a side view, partially diagrammatic, of the support assembly of FIG. 1 in an extended mode.
Figure 5:
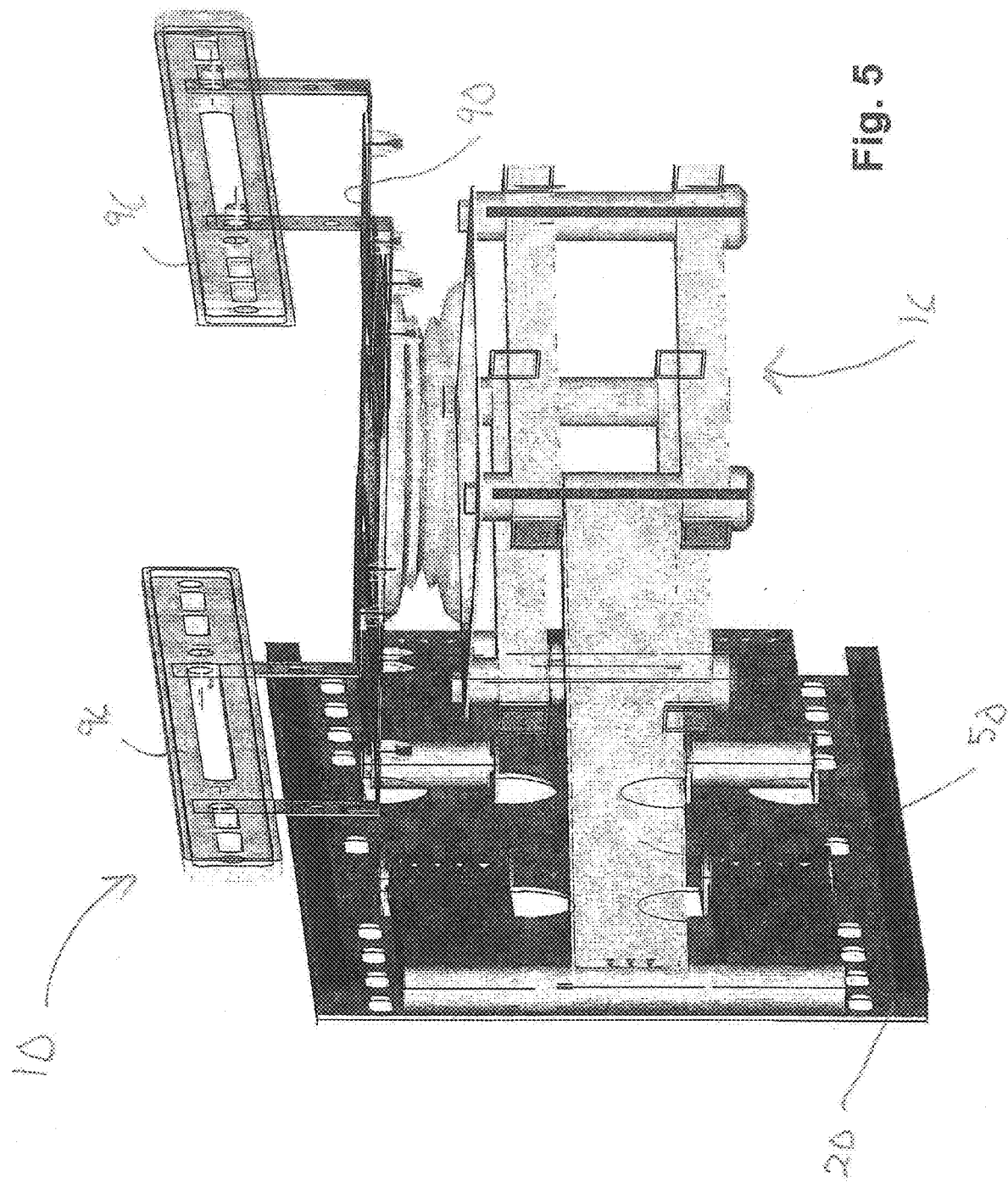
FIG. 5 is a perspective view of the support assembly of FIG. 1 taken generally from the right side thereof with a support portion being oriented in a different angular position.
Figure 6:
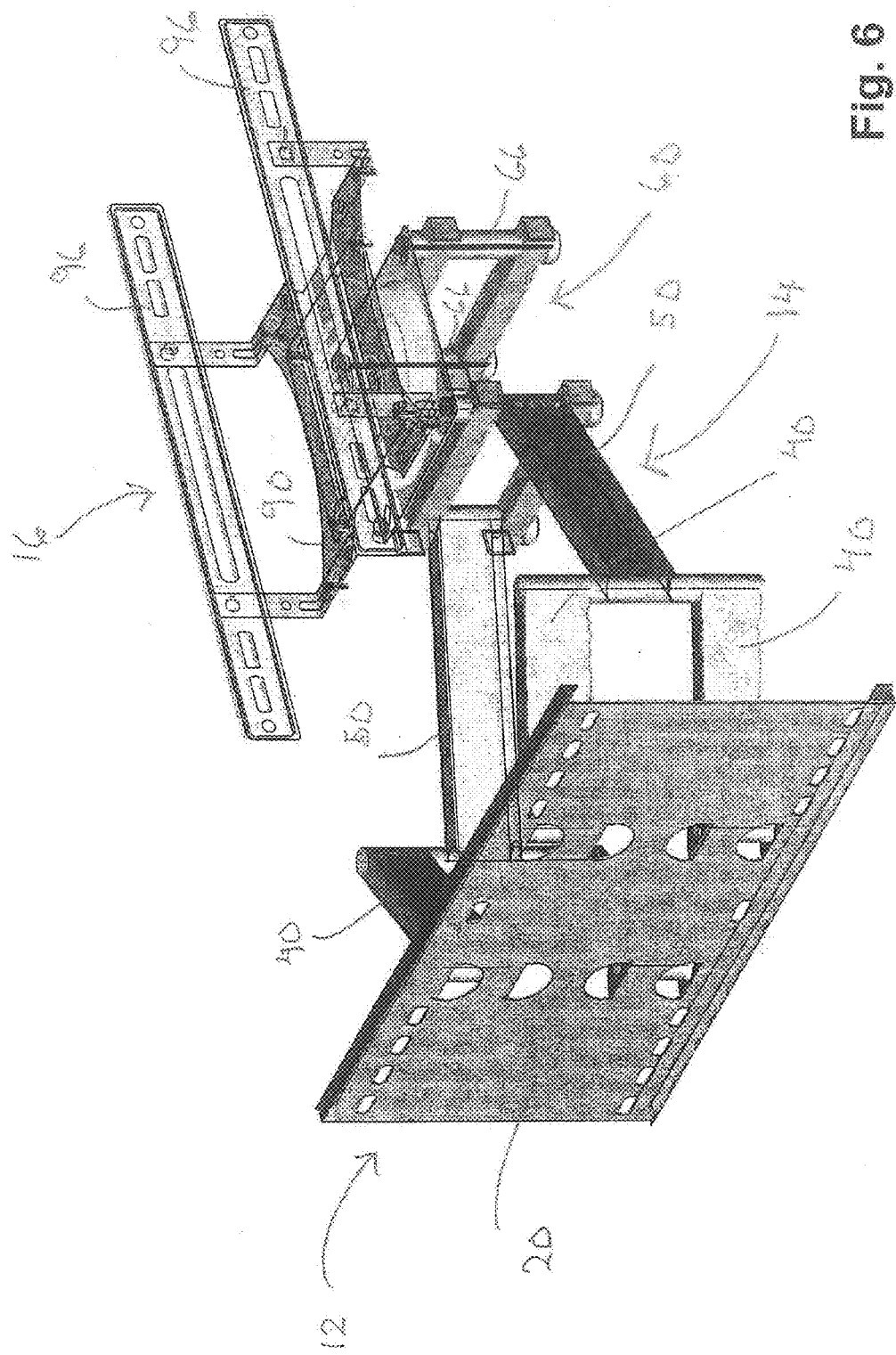
FIG. 6 is a perspective view of the support assembly of FIG. 1 in an extended position.
Figure 10:
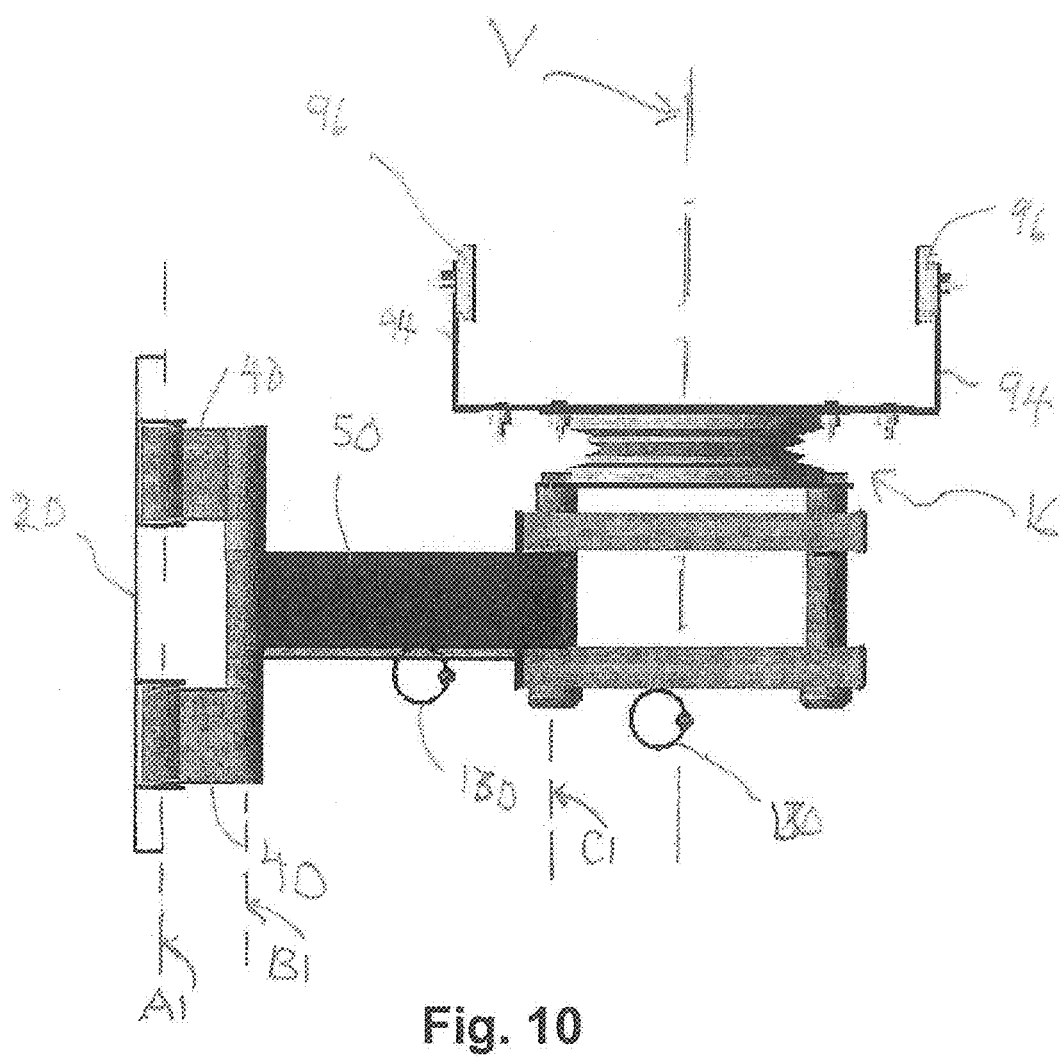
FIG. 10 is a generally right side view, partially diagrammatic, of the support assembly embodiment in the configuration of FIG. 9.

The support assembly 10 is described in terms of its preferred orientation in which it is mounted to a vertical wall and is horizontally extendable from the wall for universal positioning about a vertical axis (see axis V in FIGS. 4 and 10). It should be appreciated that other orientations are possible.

The support assembly 10 comprises a mounting module 12 which functions as the principal structural interface with a wall or vertical structure. The mounting module 12 pivotally mounts an articulating arm module 14 which functions to variably position a table module 16 relative to the wall or vertical structure. The table module 16 functions as a receiving platform for the computer C or other object to be supported and also functions to provide a universal 360° positioning relative to a central vertical axis.

The mounting module 12 includes a mounting plate 20 of steel or other rugged material which has integral or welded angleirons or reinforcement ribs 24 and 26 at opposed top and bottom portions, respectively. The mounting plate 20 is preferably multiply punched to form two laterally spaced, integral vertically aligned pairs of perpendicularly projecting support anchors 28. The anchors 28 each have an aperture 29. The apertures function to receive pivot pins 30 to pivotally connect with the articulating arm module 14, as further described below. The mounting plate 20 may also include various openings 22 to facilitate the attachment of the mounting plate to the wall or vertical structure. The attachment may be accomplished by bolts, various other fasteners or hangers (none illustrated) which engage with the wall or vertical structure.

The articulating arm module 14 comprises two pairs of elongated arms 40, each of which, at opposing ends, mounts or forms a proximal bushing 42 and a distal bushing 44, respectively. As used herein, "proximal" and "distal" refer to positions relative to the mounting plate upon extension. The proximal bushing 42 functions as a vertically disposed bushing which receives a pivot pin 30 (in the form of a bolt, a rod, an axle, a pin or other elongated member) extending through each aperture 29 of a pair of projecting anchors 28. The arms 40 are preferably steel or other rugged material having a uniform length L. In one embodiment, the arms have a substantially rectangular form. The bushings 42 and 44 may be formed by bores, sleeves or partially formed by spaced cylindrical members. The arms 40 are thus pivotally mounted to the mounting module 12 in a tandem pair of upper and lower arms which extend horizontally or function to variably move outwardly in parallel relationship relative to the vertically disposed mounting plate 20.

Figure 1:
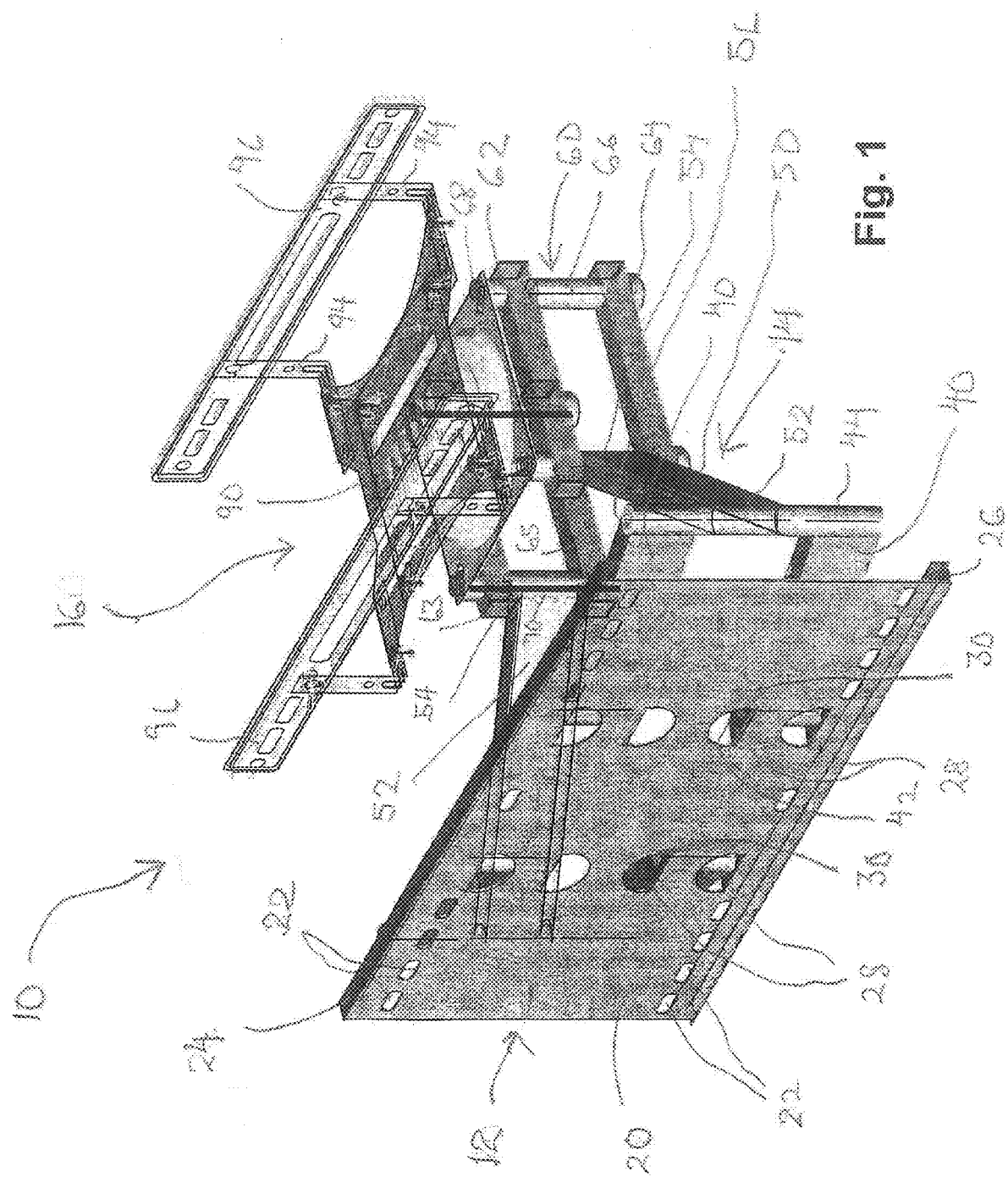
FIG. 1 is a perspective view, partially in phantom, of an extendable universal support assembly.
Figure 2:
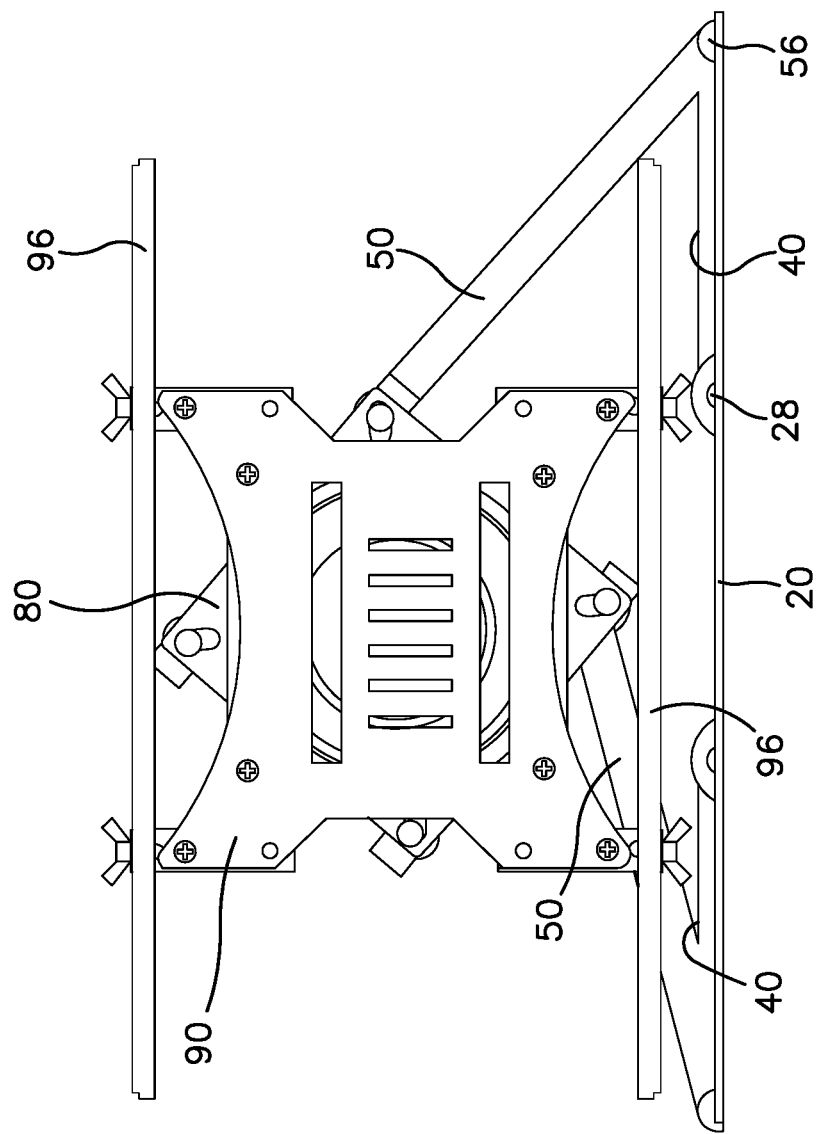
FIG. 2 is a top plan view of the support assembly of FIG. 1 in a retracted mode.
Figure 3:
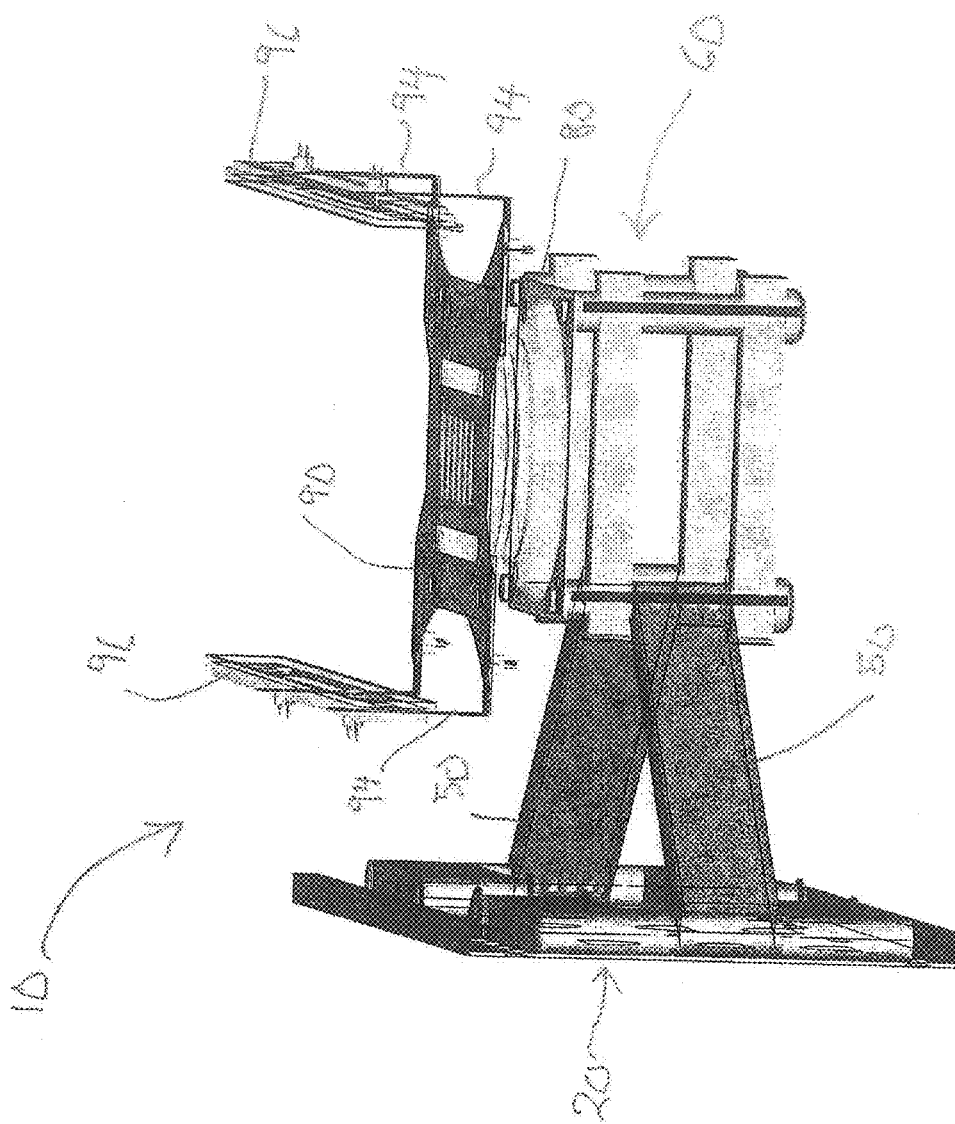
FIG. 3 is a side perspective view of the support assembly of FIG. 1 in a semi-extended mode.

A pair of heavy duty transition arms 50 each mounts or has an orthogonal proximal and a parallel distal bushing 52 and 54, respectively. The bushings 52 and 54 may be formed by bores, sleeves or other cylindrical structures. A pivot pin 56 (bolt, axle, rod, pin, etc.) extends through an upper distal bore 44 of upper arm 40 and the proximal bushing 52 of an arm 50 and a distal bushing 44 of a lower arm 40 to pivotally mount the proximal end of each arm 50 relative to the distal end of an arm 40. It will be appreciated that the bushings 42, 44, 52, 54 function as vertical receivers and the pivot pins 30, 56 form vertical pivot axes A1, A2 and B1, B2, respectively, for the proximal and distal bushings of arms 40 and the proximal and distal ends of arms 50 so that the articulating arms 40, 50 may be essentially selectively retracted against or toward the mounting plate 20, as best illustrated in FIG. 2, and extended outwardly away from the mounting plate, as best illustrated in FIG. 4. The arms 50 have a uniform length L and preferably have a substantially rectangular elongated tubular form. The arms are preferably made of a heavy duty sturdy material, such as steel.

Figure 7:
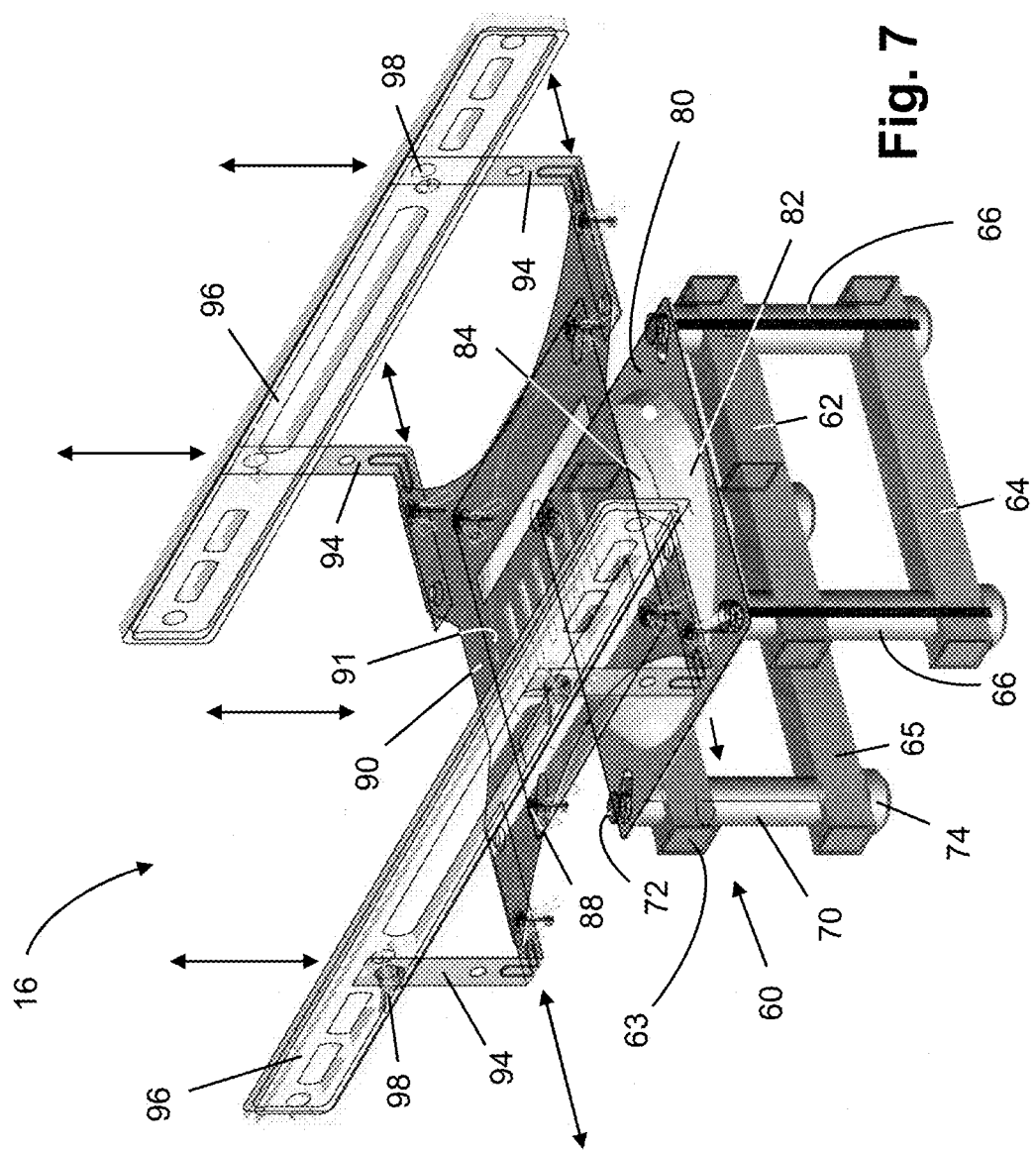
FIG. 7 is an enlarged fragmentary perspective view, partially diagrammatic, of a portion of the support assembly of FIG. 1 further illustrating universal and adjustable features thereof.
Figure 8:
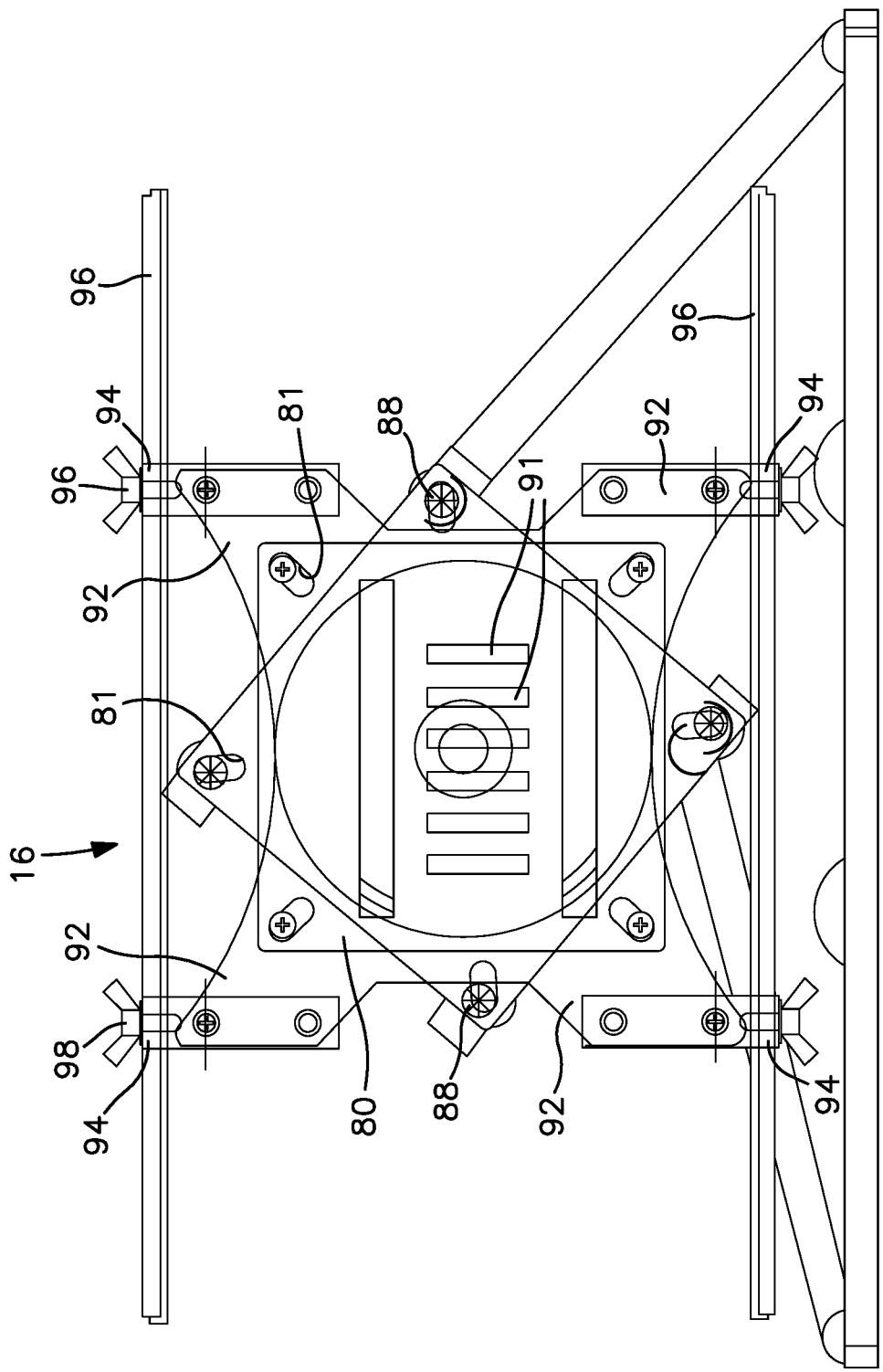
FIG. 8 is a top plan view of the portion of FIG. 7 with a breather pad (illustrated in phantom) thereof removed.

With additional reference to FIGS. 7 and 8, the table module 16 comprises a frame structure 60 supporting a cover plate 80. The cover plate 80 has a rectangular structure and, at each corner, has an oblong opening 81. The frame structure 60 comprises outer parallel upper and lower square tubular members 62 and 64 which each receive an outer leg post 66 at spaced end locations to form a rigid structure. The cover plate 80 is secured to each outer leg 66 by a fastener 68 extending through opening 81.

A set of inner parallel upper and lower square tubular members 63 and 65 each receive an inner leg assembly 70 at spaced end positions. Inner leg assemblies 70 each receives a fastener or pivot member 72 which extends through an opening 81 of cover plate 80 and is secured at a bottom foot 74 to pivotally connect the articulating arm assembly 14 and the table assembly 16 via a distal bushing 54 of each articulating arm 50 to define vertical pivot axes C1 and C2. The tubular members 62, 63, 64 and 65 are substantially parallel and form two laterally disposed cross supports.

The cover plate 80 mounts a two-piece turntable 82 and 84 which rotates 360° about a central vertical rotational axis V. The upper portion of the turntable receives and is secured to a receiver platform 90 by fasteners 88. The receiver platform 90 is preferably slightly contoured and has a plurality of lower vents 91 and functions as a breather support.

Each corner of the receiver platform 90 has a pair of laterally spaced wings 92. Each wing 92 mounts and connects with an L-shaped bracket 94 which may be laterally positionable relative to the central vertical axis. The L-shaped bracket 94 mounts a retainer rail 96 which also may be vertically adjustable by a wing nut 98 connecting through various openings and positions of the bracket 94. A second set of L-brackets 94 and a side rail 96 are also mounted at a second end of the receiver platform 90. It will be appreciated that the brackets 94 may be suitably adjusted to provide a variably positionable lateral width as well as a vertical retainer height for the table module to provide a cradle for securely receiving a computer or other electronic item of various dimensions. See FIG. 7 arrows schematically illustrating the lateral and vertical adjustments.

A breather pad 93 may optionally be placed on the platform 90. In one embodiment, the breather pad 93 is a sheet of material made from a material similar to air filter material for a commercial stove vent exhaust and has dimensions of approximately ⅛ by 8 by 10 inches. The breather pad 93 and the side rails 96 insulate a received computer or object from electric, electrostatic and electromagnetic interference.

Figure 16:
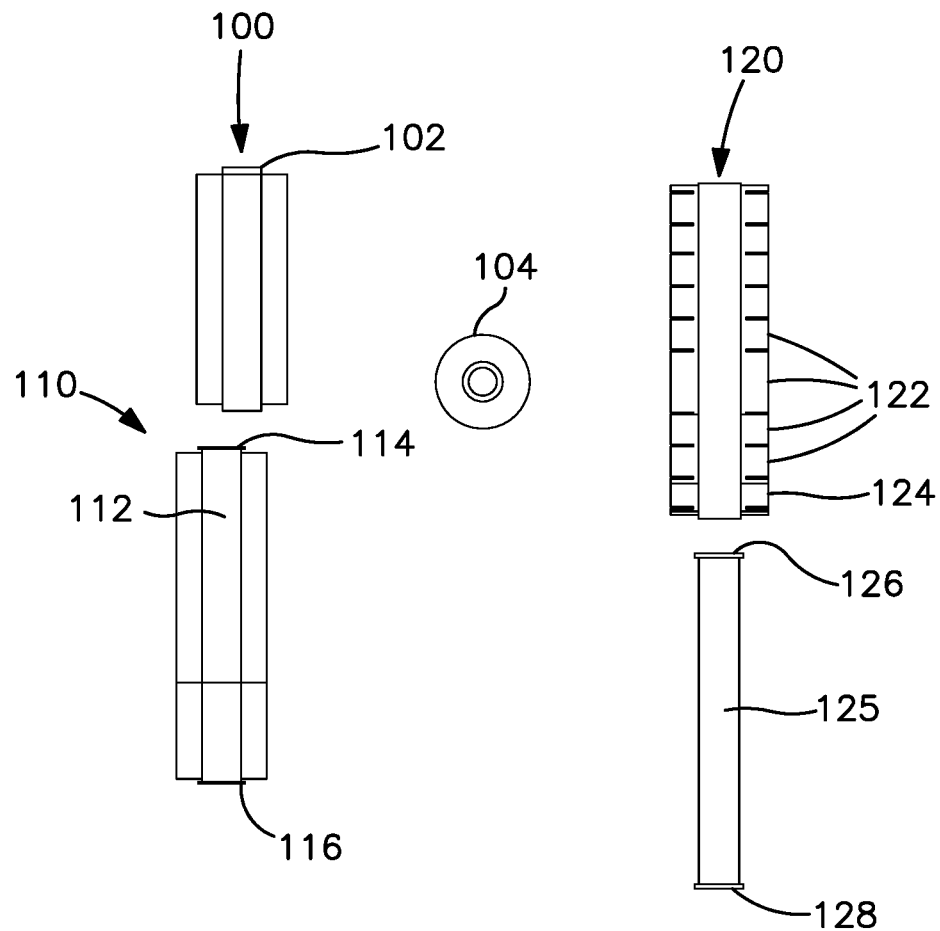
FIG. 16 is an annotated schematic view illustrating possible assembly techniques and constructions of pivot connections for the support assembly.
Figure 17:
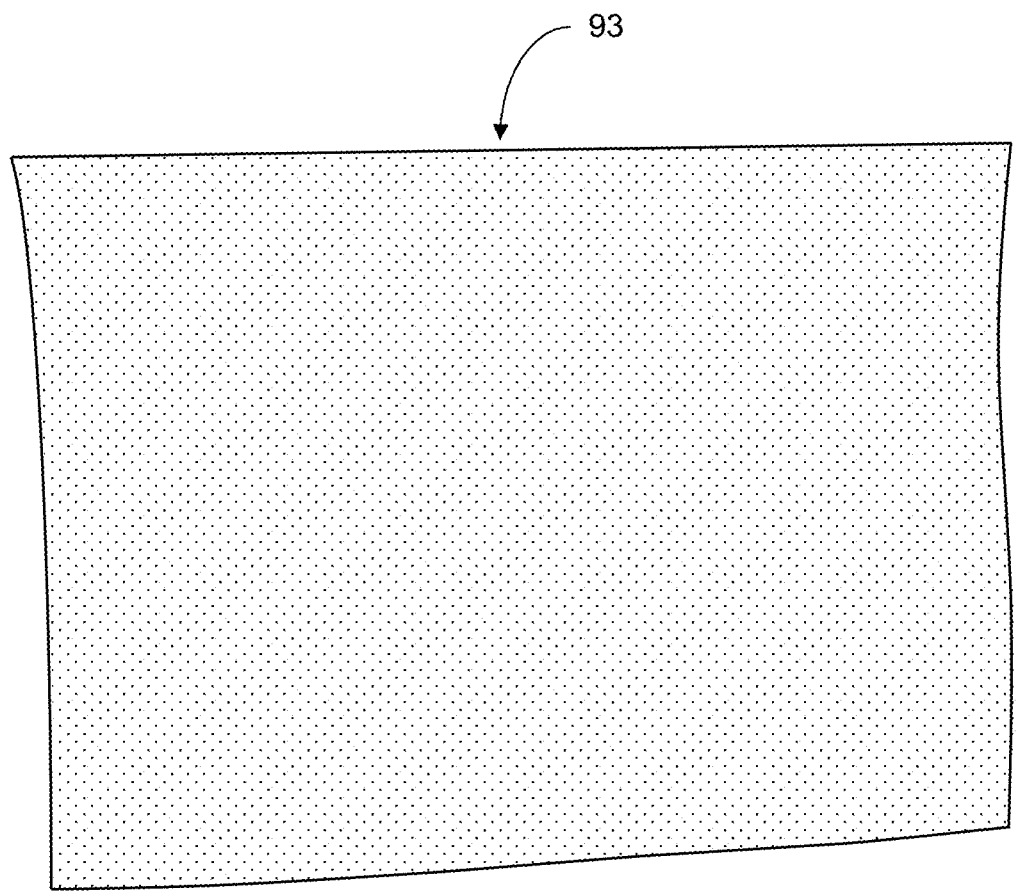
FIG. 17 is a photograph of a breather pad which may be mounted on the support assembly.

The pivot connections for the support assembly may be formed by a number of techniques. In one embodiment, the pivot connections are implemented by passing a bolt through the bushing and threading the end into a nut or cap which may be spot welded in place. With reference to FIG. 16, in another possible bushing configuration 100, a steel sleeve 102 has spacer washers 104 at end locations and is filled with a two-part epoxy. Alternatively, for bushing configuration 110, an internal sleeve 112 may be secured by the top and bottom by peening over the ends 114, 116 to secure the sleeve in place to the various members or arms. In another pivot pin/bushing configuration 120, no epoxy is required, and additional spacers 122 are placed within the bushing and the housing 124. The ends 126 and 128 of the internal sleeve 125 are peened over to hold the sleeve 125 in place.

Figure 9:
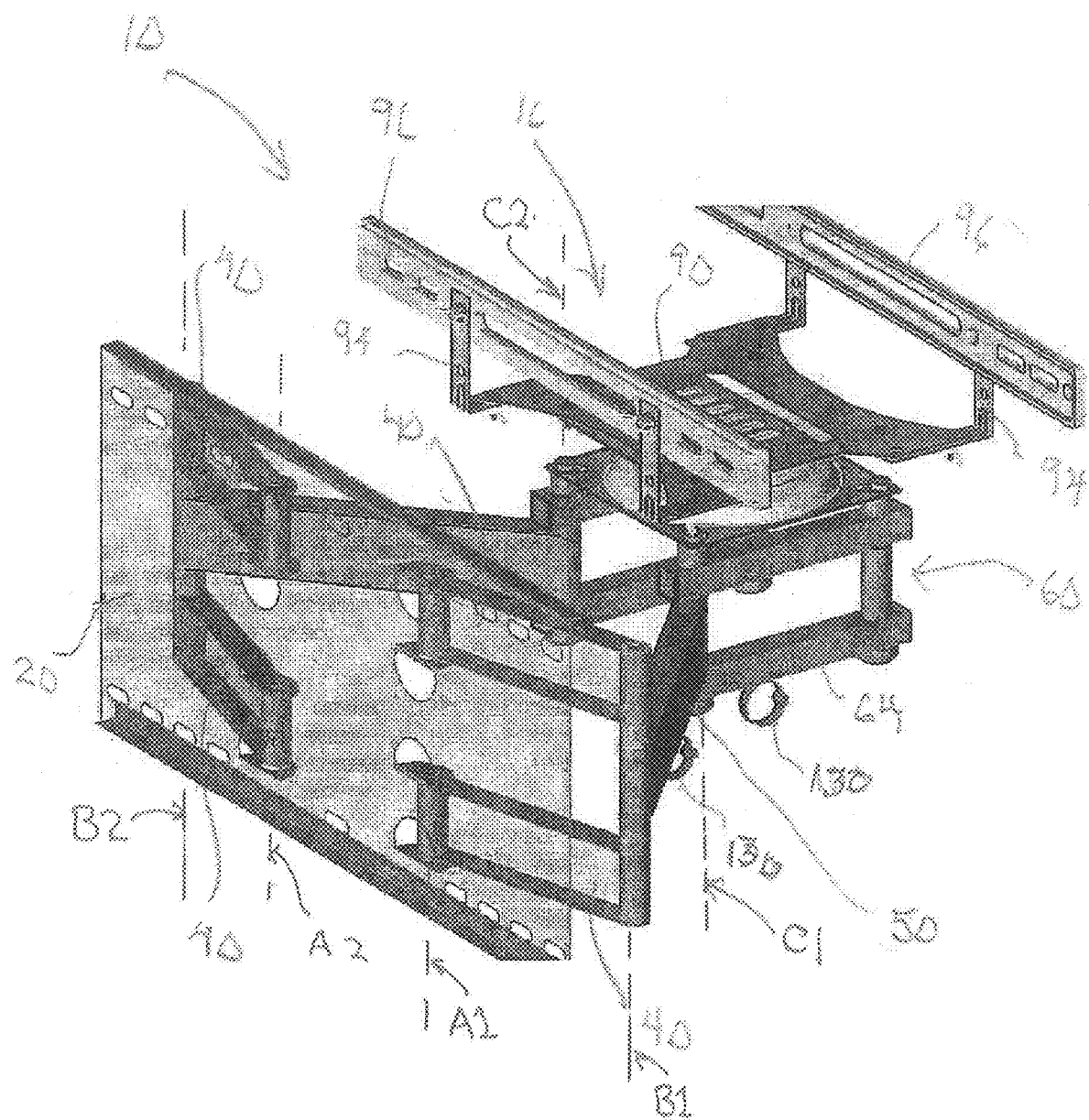
FIG. 9 is a perspective view similar to FIG. 1, partially diagrammatic, illustrating a second embodiment of a support assembly with portions of the assembly being transparent to better illustrate the support assembly.
Figure 11:
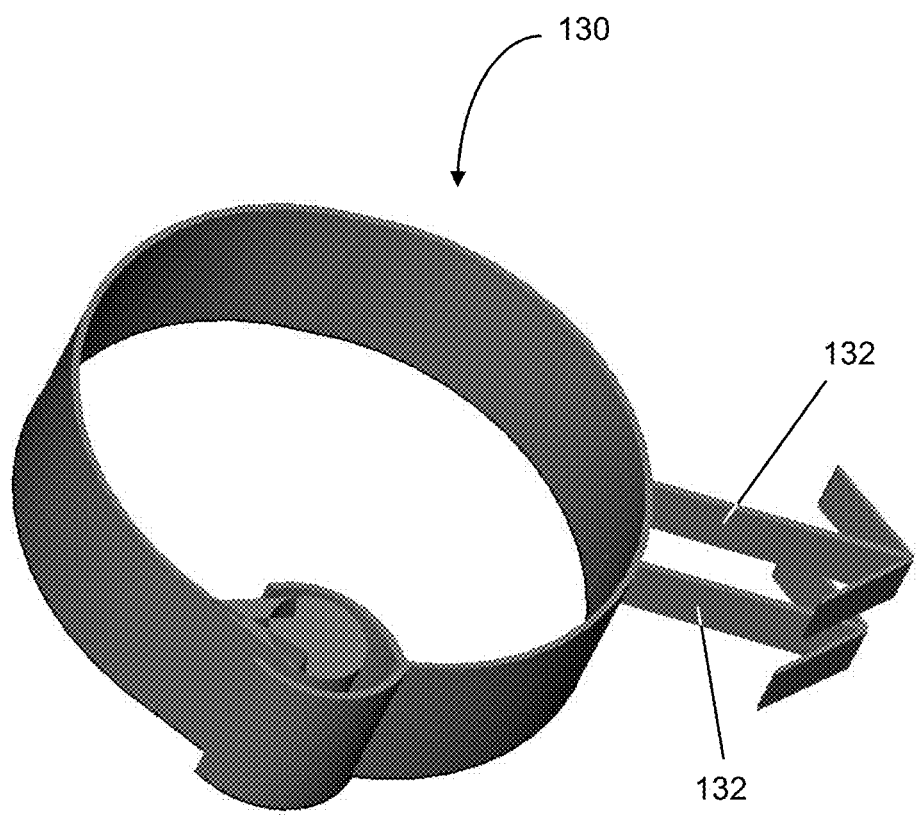
FIG. 11 is an enlarged view of an electrical lead retainer employed in the embodiments of FIGS. 9 and 10.
Figure 12:
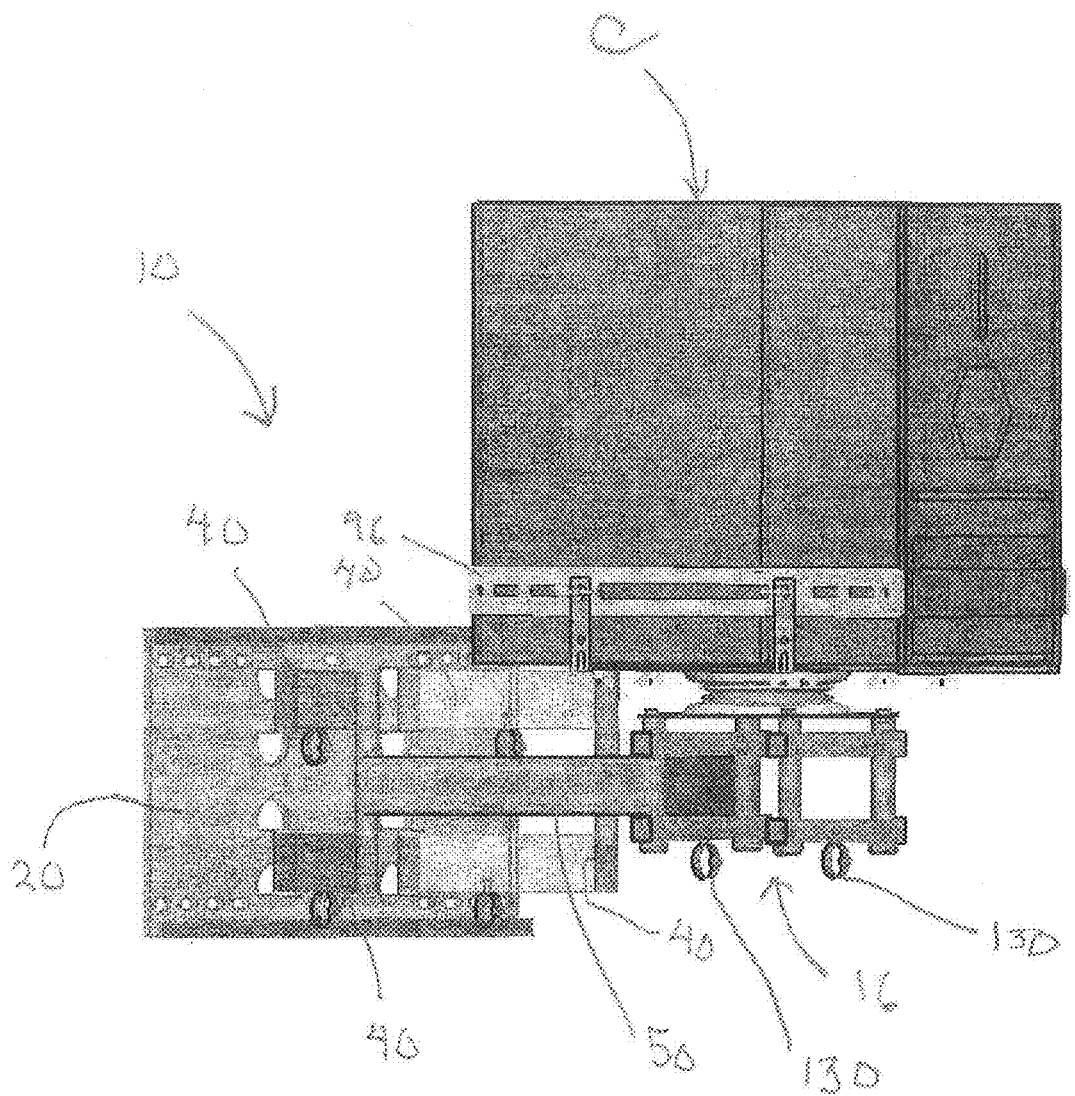
FIG. 12 is a generally side perspective view of the support assembly with a computer received thereon in a first positional mode.
Figure 13:
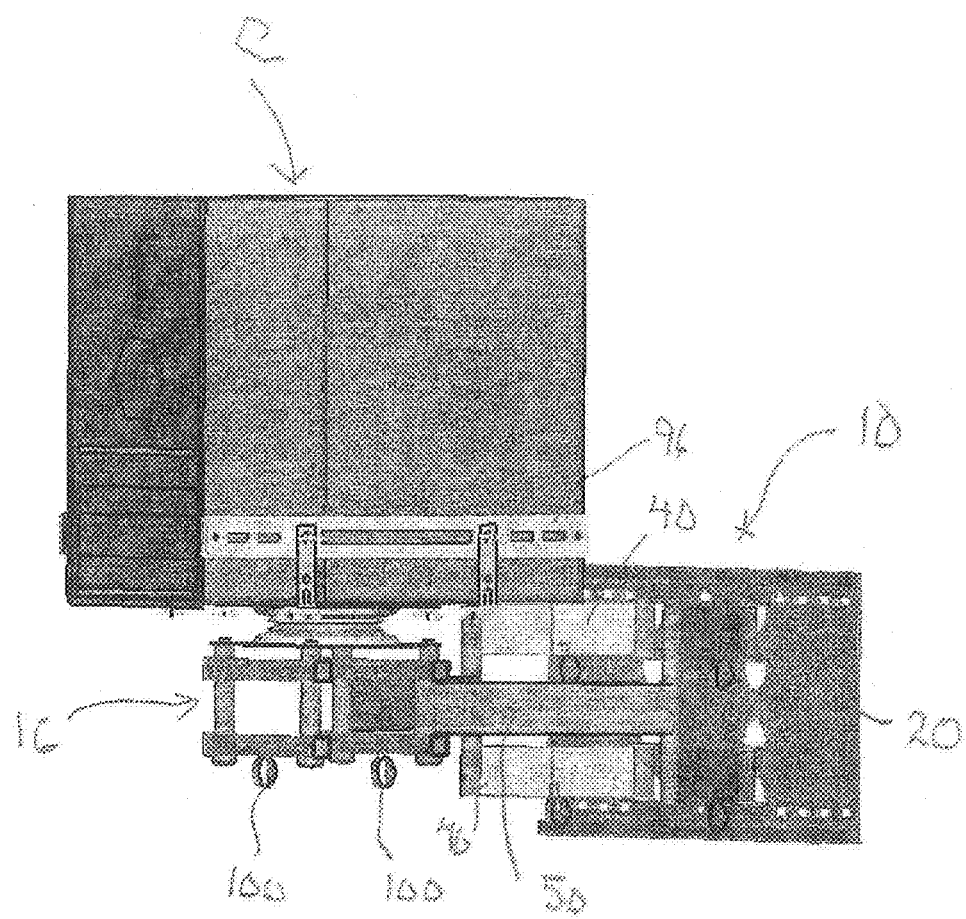
FIG. 13 is a generally opposite side view of the computer and support assembly of FIG. 12.
Figure 14:
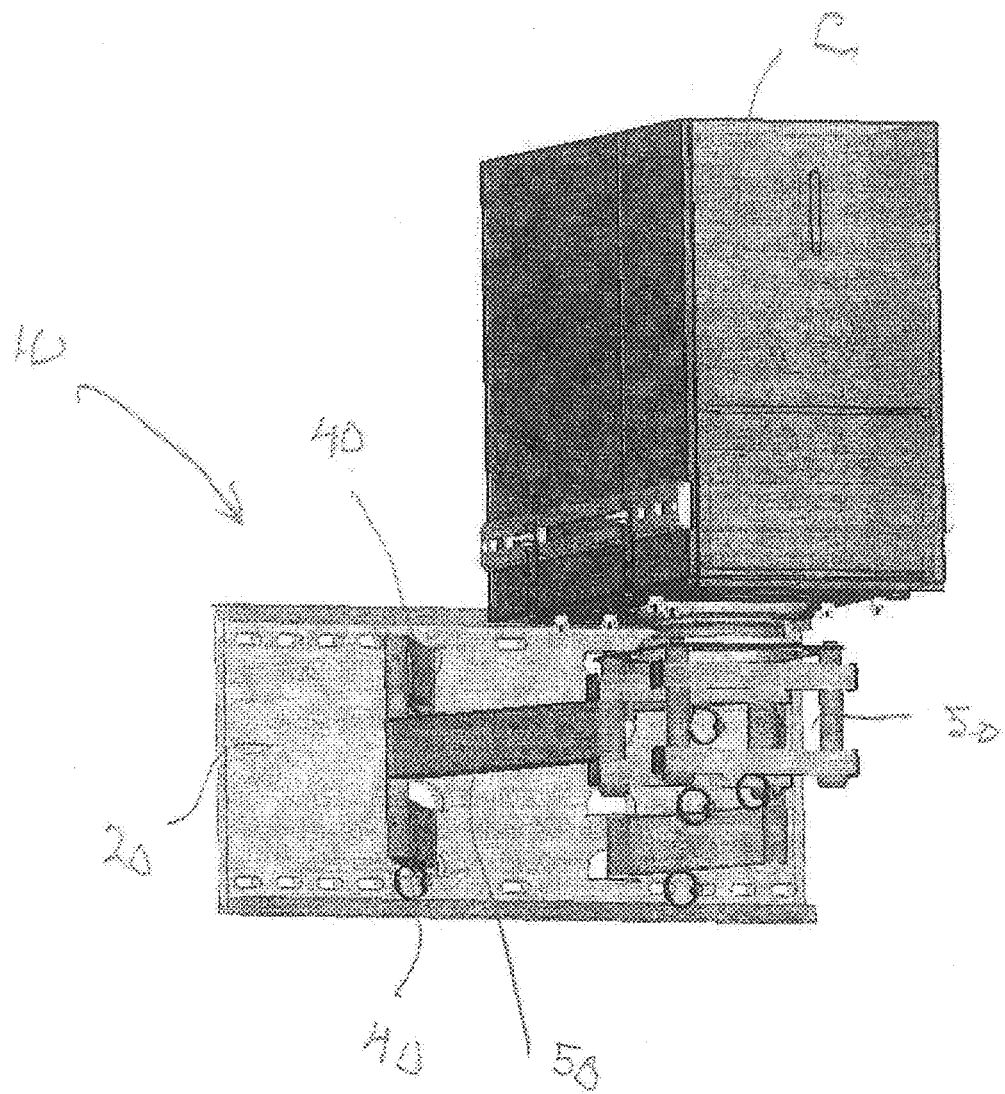
FIG. 14 is a generally frontal perspective view of the computer and support assembly of FIG. 12.
Figure 15:
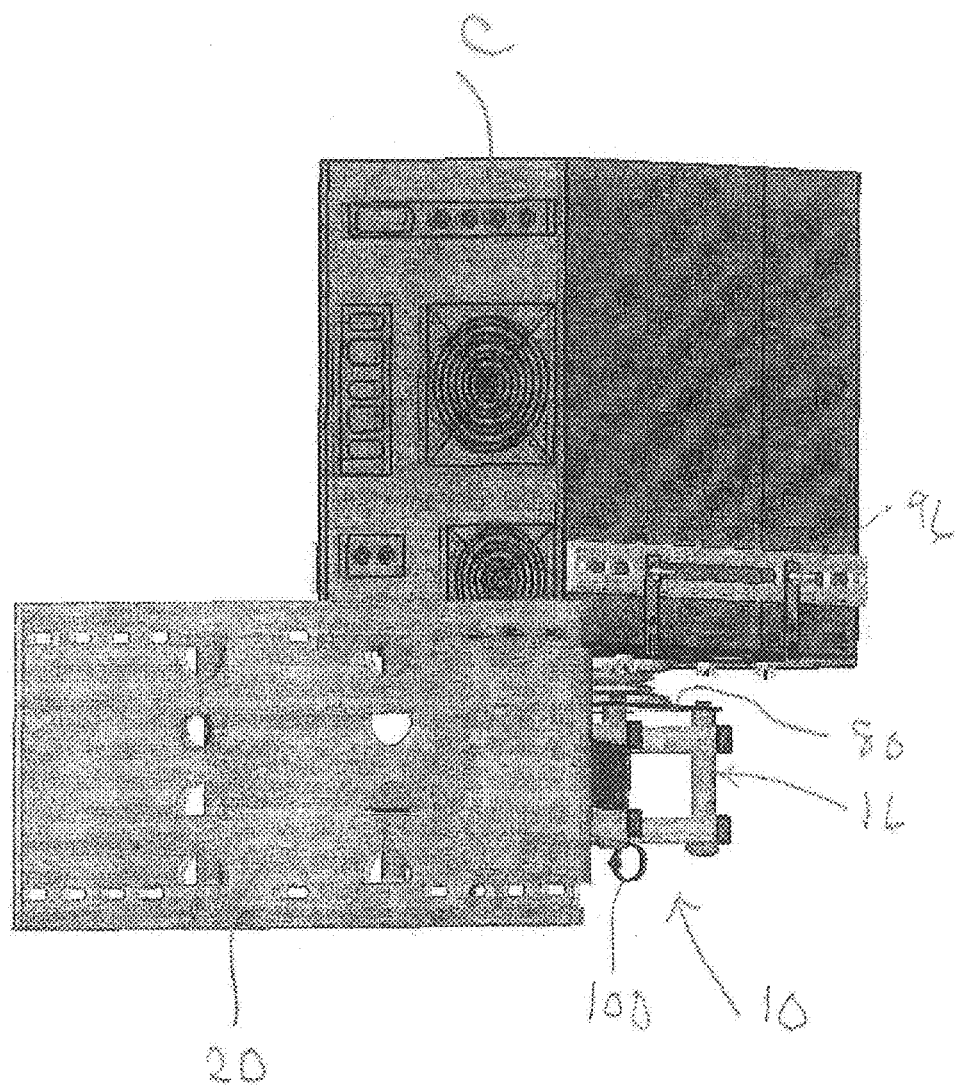
FIG. 15 is a generally rear view of the computer and support assembly of FIG. 12.

With reference to FIGS. 9-11, ring-like retainer straps 100 may be mounted via tabs 130, 132 at the arms 40, 50 and members 64, 65 to provide a carrier for electrical leads for the computer or other electronic equipment.

It will be appreciated that the table module, and in particular the lengths of the retainer arms 96, provide sufficient clearance in the extended position so that the turntable may be selectively rotated 360° about the vertical axis V which is parallel to axes A1, A2, B1, B2, C1 and C2.

With reference to FIGS. 12-15, the entire table module 16 may be transversely retracted to a retracted storage position by urging it toward the mounting plate and collapsing the articulating arm assembly 14. Consequently, in a retracted storage position, the computer C (or box-like electronic devices) may be essentially positioned adjacent the wall or vertical structure, and in an extended position, the computer or object may be pulled or pushed away from the retracted position, and in an extended position, the support may be rotated as required for providing access to the various sides of the computer or other object.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A support assembly for a computer or electronic device comprising:
   a mounting bracket having a planar first side defining a plurality of openings and two laterally spaced sets of two pairs of aligned anchors integrally projecting at an opposite second side;
   a first set of two pairs of arms pivotally mounted to said bracket anchors and defining a first pair of parallel pivot axes;
   a second set of arms wherein each arm is pivotally mounted between two arms of said first set of arms and defining a second pair of parallel pivot axes;
   a frame pivotally mounted to said second set of arms and comprising four posts parallel to said first and second pair of pivot axes wherein two pairs of posts are connected by a pair of parallel cross supports; and
   a table rotatably mounted to said frame and positionable about a rotation axis parallel to said first and second pivot axes;
   wherein said table is variably transversely positionable relative to said mounting bracket and rotatable about said rotation axis.

2. The support assembly of claim 1 further comprising at least one wire retaining strap mounted to an arm or said frame.

3. The support assembly of claim 1 further comprising a pair of opposed parallel retainers mounted to said table and axially positionable relative to said table.

4. The support assembly of claim 1 wherein each of said anchors defines an opening for receiving a pivot pin.

5. The support assembly of claim 1 wherein said first set of arms are substantially identical and said second set of arms are substantially identical and each arm of said first set of arms and said second set of arms has a substantially rectangular elongated tubular form.

6. The support assembly of claim 1 wherein said anchors are perpendicular to said first side and there are two pairs of four aligned anchors each defining openings for receiving a pivot pin.

7. A support assembly for a computer or electronic device comprising:
   a mounting bracket having a planar first side defining a plurality of openings and two laterally spaced sets of two pairs of vertically aligned anchors integrally projecting at an opposite second side;
   a first set of two pairs of arms of length L pivotally mounted to said bracket anchors and defining a first pair of parallel pivot axes;
   a second set of arms of length L wherein each arm is pivotally mounted between two arms of said first set of arms by a pin and defining a second pair of parallel pivot axes;
   a frame pivotally mounted to said second set of arms and comprising four posts parallel to said first and second pair of pivot axes wherein two posts receive a pivot pin for pivotally mounting said frame to said second set of arms and two pairs of connected posts, said frame mounting a platform; and a table rotatably mounted to said platform and positionable about a rotation axis parallel to said first and second pivot axes;

wherein said table is variably positionable relative to said mounting bracket and rotatable about said rotation axis.

8. The support assembly of claim 7 wherein said first set of arms are substantially identical, and said second set of arms are substantially identical and each arm of said first and said second set of arms has a substantially rectangular form.

9. The support assembly of claim 7 further comprising a plurality of wire retaining straps mounted to an arm and to said frame.

10. The support assembly of claim 7 further comprising a pair of opposed parallel retainers mounted to said table and axially positionable relative to said table.

11. The support assembly of claim 7 wherein each of said anchors defines an opening for receiving a pivot pin.

12. The support assembly of claim 7 wherein said anchors are perpendicular to said first side and there are two pairs of four aligned anchors each defining openings for receiving a pivot pin.

* * * * *